(12) United States Patent
Brisighella

(10) Patent No.: US 6,341,562 B1
(45) Date of Patent: Jan. 29, 2002

(54) INITIATOR ASSEMBLY WITH ACTIVATION CIRCUITRY

(75) Inventor: Dario G. Brisighella, Mendon, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/510,612

(22) Filed: Feb. 22, 2000

(51) Int. Cl.$^7$ .............................................. F42C 19/08
(52) U.S. Cl. .................. 102/202.14; 102/200; 102/202; 102/202.9
(58) Field of Search ........................ 102/202.14, 202.9, 102/200, 202

(56) References Cited

U.S. PATENT DOCUMENTS

| | | | |
|---|---|---|---|
| 4,708,060 A | 11/1987 | Bickes, Jr. et al. ...... | 102/202.7 |
| 5,142,982 A | * 9/1992 | Diepold et al. .......... | 102/202.5 |
| 5,411,289 A | 5/1995 | Smith et al. ............. | 280/735 |
| 5,454,320 A | * 10/1995 | Hilden et al. ............ | 102/202.7 |
| 5,495,806 A | * 3/1996 | Willey .................... | 102/202.14 |
| 5,621,183 A | * 4/1997 | Bailey .................... | 102/202.7 |
| 5,796,177 A | 8/1998 | Werbelow et al. ........ | 307/10.1 |
| 5,821,446 A | * 10/1998 | Chatley, Jr. ............. | 102/202.7 |
| 5,825,098 A | 10/1998 | Darby et al. ............. | 307/10.1 |
| 5,835,873 A | 10/1998 | Darby et al. ............. | 701/45 |
| 5,882,034 A | 3/1999 | Davis et al. ............. | 280/735 |
| 5,988,069 A | * 11/1999 | Bailey .................... | 102/202.9 |
| 6,009,809 A | * 1/2000 | Whang .................... | 102/202.7 |
| 6,073,963 A | * 6/2000 | Hamilton et al. ........ | 102/202.9 |
| 6,166,452 A | 12/2000 | Adams et al. ............. | 307/10.1 |

FOREIGN PATENT DOCUMENTS

GB  2 123 122 A  1/1982  ........... F42C/19/12

OTHER PUBLICATIONS

Drawing of "Initiator Assembly Including Circuit Board".

* cited by examiner

Primary Examiner—Charles T. Jordan
Assistant Examiner—Lulit Semunegus
(74) Attorney, Agent, or Firm—Sheridan Ross P.C.

(57) ABSTRACT

An initiator assembly for use with a propellant-actuated device located in a vehicle is provided. In one embodiment, the initiator assembly includes circuitry and an integral, one-piece insert member that are injection molded with insulating material to an initiator. The insert member suitably engages an initiator adapter for holding the initiator assembly in place relative to the inflator housing both before and after the initiator assembly is ignited. The circuitry is capable of receiving and processing a signal to determine whether to send an ignition signal to ignite the propellant within the inflator.

16 Claims, 6 Drawing Sheets

INITIATOR ASSEMBLY WITH ACTIVATION CIRCUITRY

FIELD OF THE INVENTION

The present invention relates to initiators involved in controlling propellant-actuated devices (PADs) and, in particular, an initiator assembly having a circuit board with components to receive and process control signals to determine whether to activate such a device.

BACKGROUND OF THE INVENTION

Inflators for inflating an air bag or other inflatable in a vehicle typically include an initiator assembly for igniting the propellant that is contained within the inflator housing. Upon activation of the propellant, it generates gases for filling the inflatable. The initiator assembly commonly includes an exterior configuration or member for connecting to a supporting structure. The assignee of the present application has previously developed an initiator assembly with an outer metal casing that has a collar for coupling to the inflator housing. The collar is located at the outer surface of insulating material that surrounds initiator conductive pins. In an initiator assembly design of another, it is known to injection mold portions of a cover with plastic material that surrounds portions of the initiator. The assignee of the present application has also developed an initiator assembly that facilitates a suitable connection between the initiator assembly and the inflator housing, while reducing the size of the injection molded part. Initiators have also been advanced that contain their own printed circuit board (PCB) including electronic components. The PCB processes control signals involved in the determination of whether or not to trigger or ignite the initiator.

Notwithstanding these previous disclosures, it is desirable to provide an initiator assembly that incorporates circuitry to receive and process a signal for use in determining whether to initiate at least one propellant actuated device, such as an automotive inflator, seat belt pretensioner, pin puller, cable cutter and/or gas generator. Due to the size of such circuitry, typically within the range of approximately 6–12 mm in diameter, incorporating such circuitry into an initiator assembly requires solutions to certain problems and consequences. For example, a typical initiator cap would not be large enough to house such circuitry. A larger initiator cap presents problems related to unwanted increased size and installation in the vehicle, in addition to the manufacturing cost for the initiator.

SUMMARY OF THE INVENTION

In accordance with the present invention, an initiator assembly is provided for use with devices that are activated when a propellant is ignited including an inflator, a seat belt pretensioner, a pin puller, a cable cutter and a gas generator. In the embodiment of an automotive inflator, the initiator assembly can comprise an initiator, circuitry and a collar assembly joined to the initiator. In another embodiment, the initiator assembly includes the initiator and the circuitry, but not the collar assembly. When activated by an ignition signal received by an initiator conductive pin and processed by the circuitry, the initiator assembly ignites the propellant contained in an inflator housing. In addition to at least one conductive pin, the initiator has a cap member that surrounds a charge that ignites when the circuitry receives a signal and determines to send the ignition signal. When present or being included, the collar assembly holds the initiator assembly to the inflator housing including after activation of the initiator.

The collar assembly includes an injected molded insulating material and an insert member that is fixedly joined to the insulating material during the injection molding process. The insert member can be configured according to a number of different embodiments, any one of which can be readily connected to an inflator housing by injection molding with the insulating material. The assignee of the present invention has previously developed such insert members and has filed application Ser. No. 09/044,523 entitled "Inflator Initiator With Insert Member" relating thereto and which is hereby incorporated by reference. At least one of the embodiments of the insert member is part of an initiator assembly that has a single conductive pin. However, other embodiments can be employed that have more than one such conductive pin.

The circuitry is capable of receiving and processing a control signal to determine whether to send an ignition signal to the initiator. The circuitry may be configured in many embodiments and may be positioned in a variety of locations within the initiator assembly, including on either side of the insert member. The circuitry may be electrically insulated by proper positioning of the circuitry within the initiator assembly before injection molding the insulating material. The circuitry is also properly protected against the high temperature(s) and pressure(s) that the electronic components can be subjected to during the injection molding process. This protection can include a protective coating or cover surrounding the circuitry that is provided before it is injection molded to the initiator. The circuitry may also contain one or more pass through ports or other connection (s) for a conductive pin. Importantly, the circuitry can be utilized with currently sized and available initiators.

Additional advantages of the present invention will become readily apparent from the following discussion, particularly when taken together with the accompanying drawings.

DETAILED DESCRIPTION

Figure 1:
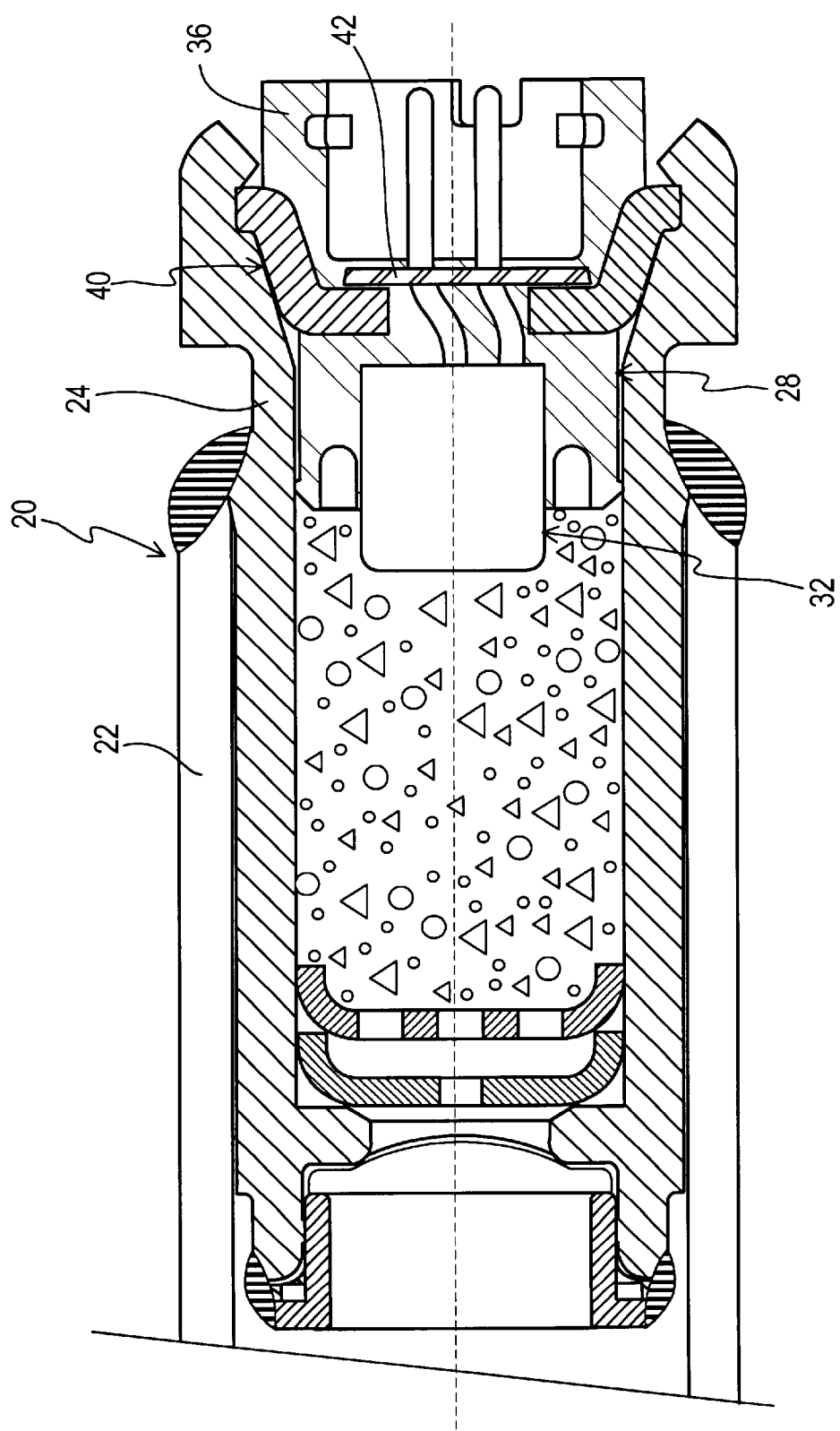
FIG. 1 is a longitudinal, cross-sectional view of an initiator assembly of a first embodiment joined to an inflator housing without illustrating electronic components and a protective guard.
Figure 2:
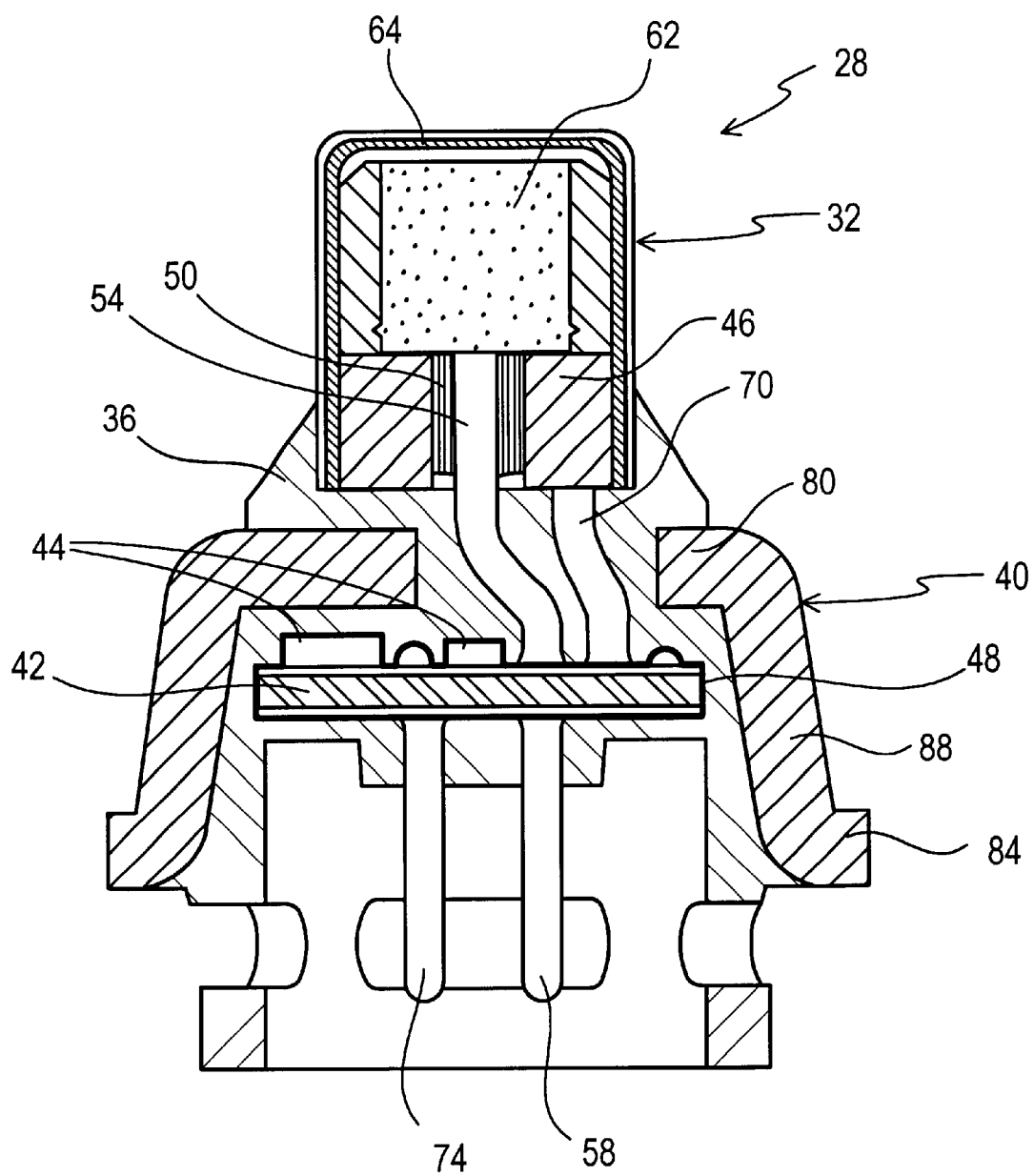
FIG. 2 is a cross-sectional view of the initiator assembly of the first embodiment with a protective guard and electronic components being illustrated as part of the activation circuitry.

With reference to FIGS. 1–2, a first embodiment of an initiator assembly of an inflator for inflating an air bag or inflatable in a vehicle is illustrated. The inflator 20 includes an inflator housing 22 and an initiator adapter 24. The initiator assembly 28 is joined at one end of the initiator adapter 24. The initiator assembly 28 includes an initiator 32 having portions surrounded by an insulating material 36. An insert member 40 and a circuit board 42 are joined to the insulating material 36. The circuit board 42 may be a printed circuit board (PCB) and can have a number of electronic components or devices 44, at least some of which are different in size, shape and/or function. With respect to combining the insulating material 36, the insert member 40, and the circuit board 42 with the initiator 32, an injection molding process is utilized in which liquid or flowable insulating material 36 is disposed about such portions of the initiator 32, portions of the insert member 40 and the circuit board 42 including components 44. When the insulating material 36 solidifies, the insert member 40 and the circuit board 42 are fixedly held to the insulating material 36 and the insulating material 36 is fixedly held to the initiator 32.

The circuit board 42 may be constructed of any suitable material, such as aluminum oxide or other ceramic material. The components and layout of the electronic circuit board allow for electrical connection between the pins on opposite sides of the circuit board.

As seen in FIG. 2, it is preferred that the circuit board 42 and the electronic components 44 be properly or sufficiently protected using a shield or guard 48. The guard 48 can surround or enclose the circuit board 42 and the electronic components 44, or at least parts thereof, in order to protect them against the consequences of the high temperature(s) and pressure(s) that are present during the injection molding process. The PCB can be comprised of materials, such as a ceramic or epoxy fiberglass, as well as having solder material that can be damaged or melt at lower temperatures than the temperatures and pressures that exist during the injection molding process for joining the PCB 42 and the electronic components 44 to the initiator 32. To protect them, the guard 48 is provided. The guard 48 can be comprised of a coating and/or a covering. The coating could include a polymer, such as any epoxy based resin or thermal set, which offers sufficient protection by allowing enough time for the injection molding process to occur without unwanted damage to the PCB 42 and the electronic components 44. The coating could be applied using a silicon-type injection device. The covering could be in the form of a plastic enclosure that snap fits about the PCB 42 and the electronic components 44, or at least portions thereof. Additionally or alternatively, two or more stages of molding might be utilized, where different temperatures are employed at the different stages, such as one stage being at a lower temperature and then conducting a further molding step at a greater temperature. Although FIG. 2 is the only drawing figure that illustrates the protection guard 48, it should be understood that guard 48 is applicable to other designs and configurations including the other embodiments described herein.

With further reference to FIG. 2, the initiator 32 includes a metal eyelet 46 having a bore 50 formed therein. A first conductive pin 54 has an upper portion positioned through the bore 50 and held in place by a glass to metal seal, for carrying an ignition signal to ignite a charge 62 using a conductive element, such as a bridge wire, semiconductor bridge or thin film resistor. The first conductive pin 54 also has a lower portion electrically connected to the circuit board 42 to receive a signal. The initiator 32 also includes a second conductive pin 70 connected at an upper portion to the initiator 32 and grounded at a lower portion on the circuit board 42. The glass and the insulating material 36 provide electrical insulation between the first and second conductive pins 54, 70. A cap member 64 surrounds or covers the charge 62 and is welded to the eyelet 46.

The lower portion of the first conductive pin 54 is connected to one side of the circuit board 42 and is electrically connected to either pin 58 or pin 74, which is connected to the other side of the circuit board 42. With respect to connecting the pins 54, 70, 58, 74 to the circuit board 42, standard electronic component connection practices can be employed including soldering of the pins to the circuit board 42. In another type connection, a press fit could be utilized that might involve a ball-socket arrangement between the end of the pin and the surface of the circuit board 42. The primary functions of the pins include conducting power to the initiator 32 and/or conducting digital signals to and from the initiator 32. In conjunction with further enhancing pin retention as part of the initiator assembly 28, one or more of the pins 54, 70, 58, 74 could be disturbed or otherwise changed from the normal or standard cylindrical shape. The pins could be grooved, knurled, bent or otherwise deformed from such a standard shape. By doing so, better engagement is achieved between the injection molded material and the pins along their length.

The insulating material 36 can include a variety of compositions including plastic-like compositions that are well-suited for electrical insulation and injection molding. The insert member 40, as shown in FIG. 2, can be an integral one-piece unit that can be defined as including an interior section 80 that begins at the outer edge of the insulating material and has an inward length or dimension that extends inwardly of the insulating material 36. In the embodiment illustrated, the interior section 80 has a free or terminating end that is surrounded by insulating material 36. The opposite end portions of the insert member 40 form a shoulder 84 that juts outwardly and away from the insulating material 36. The shoulder 84 has a length or dimension that extends in this outward direction. The insert member 40 is also defined to include an intermediate section 88 that is disposed between the interior section 80 and the shoulder 84. The intermediate section 88 is integral with the interior section 80 and the shoulder 84. The interior section 80 can be defined as including a length in a direction substantially perpendicular to substantial portions of the conductive pins 58, 74. This length is less than the length of the shoulder 84 extending outwardly from the insulating material 36. Preferably, the outward length of the shoulder is less than 2 times the inward length of the interior section. The interior section can also be defined as having a height in a direction parallel to the substantial portions of the conductive pins 58, 74. The intermediate section 88 also has an exterior height extending in the same direction. This exterior height is located outwardly of the insulating material 36 and is greater than the height of the interior section.

As shown in FIG. 2, the circuit board 42 preferably is positioned within the initiator assembly 28 between the interior section 80 and the shoulder 84 of the insert member 40 prior to injection molding of the insulating material 36. Alternatively, the circuit board 42 may be positioned between the interior section 80 of the insert member 40 and the initiator 32. In any event, the circuit board 42 may be incorporated into the structure of the initiator assembly 28 without enlarging or otherwise changing the dimensions or configuration of the initiator 32, including the lateral extent or width of the cap member 64.

In the embodiment shown in FIG. 2, the interior section 80 of the insert member 40 extends towards the interior of initiator assembly 28, preferably to a lesser extent in the proximity of second conductive pin 70. This allows for interior space between insert member 40 and the first and second conductive pins 54 and 70 that is occupied by the insulating material 36. The interior section 80 of the insert member 40 preferably extends towards the interior of the initiator assembly 28 to a greater extent to provide structural support.

The circuit board, insert member and the conductive pins may be configured and arranged in a variety of ways. For example, the circuit board 42 is electrically positioned between the pins 58, 74 and the initiator 32, in order to receive and process a signal and determine whether to send an ignition signal to the initiator 32. As noted, the circuit board 42 may physically be positioned in a variety of locations, but preferably is positioned within the insulating material 36 and most preferably between the shoulder 84 and the interior section 80 of the insert member 40.

The pins 58, 74 are electrically connected to one or more sensors that are designed to detect an occurrence, such as an impact of sufficient force to a particular section of the vehicle, and send a signal for processing. Preferably, the vehicle will contain a plurality of sensors, located throughout various sections of the vehicle, to provide data regarding the location and force of such occurrence. The signal from each sensor may be sent directly to one or more initiator assemblies, or preferably, sent to a sensor controller, which in turn sends a signal to each initiator assembly.

The vehicle can contain a plurality of propellant actuated devices including inflatables, each operably part of or connected to an initiator assembly. Each initiator assembly, through its conductive pins to its circuit board, receives a signal from the sensors or the sensor controller. The circuitry then processes the signal to determine whether to send an ignition signal for that particular propellant actuated device.

Figure 3:
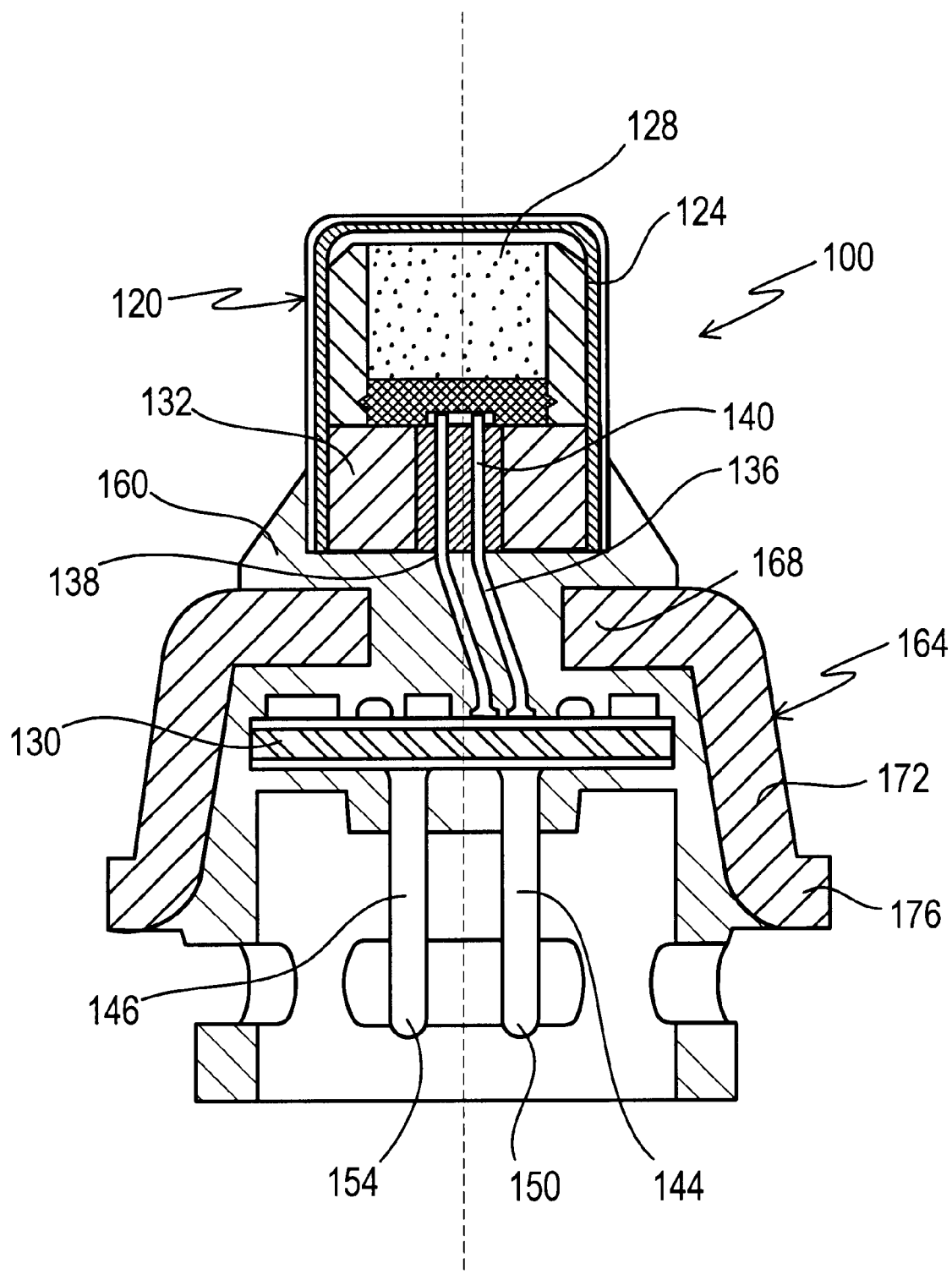
FIG. 3 is a is a cross-sectional view of an initiator assembly of a second embodiment.
Figure 4:
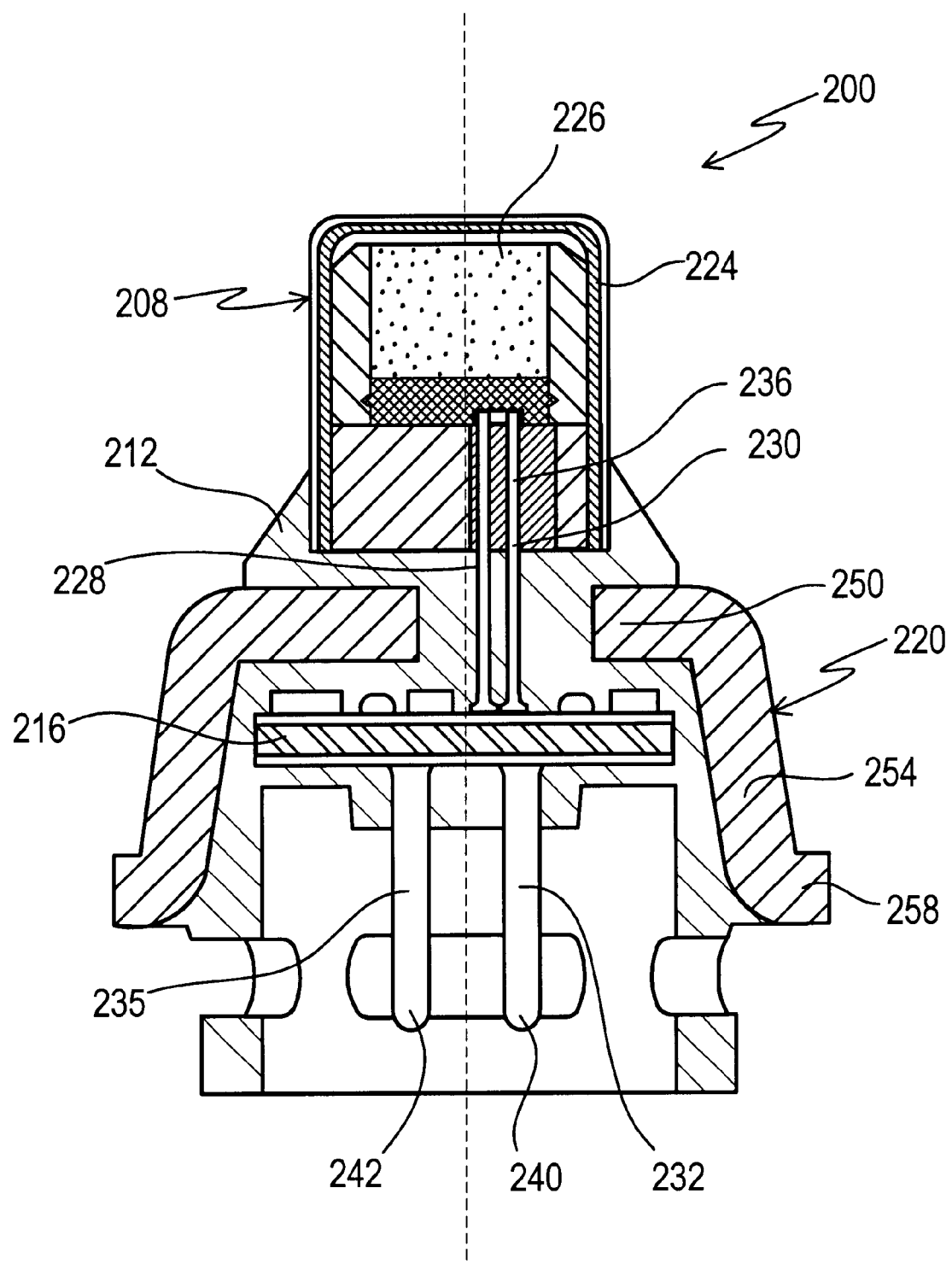
FIG. 4 is a cross-sectional view of an initiator assembly of a third embodiment.

Referring now to FIGS. 3 and 4, two alternative embodiments are disclosed, with an alternative insert member. In both embodiments of FIGS. 3 and 4, the general layout of the initiator, the insulating material, the insert member, the circuit board and the conductive pins remains essentially the same as that of FIG. 1. The manner of assembly would also essentially be the same.

With reference to FIG. 3, a second embodiment of an initiator assembly, particularly an insert member, circuit board and conductive pins, is next discussed. The initiator assembly 100 comprises an initiator 120 that includes a cap member 124, which encloses a charge composition 128 and an eyelet 132. A first conductive pin 136 and a second conductive pin 138 each have an upper portion that is held by a glass to metal seal within a bore 140 formed in the eyelet and a lower portion that is electrically connected to the circuit board 130. Pin 136 or pin 138 is electrically connected to receive and carry a signal from the circuit board 130 to ignite a charge 128. Insulating material 160 electrically insulates the two pins 136, 138 from each other, as well as surrounding portions of the cap member 124.

Like the first embodiment, the lower portion of the first conductive pin 136 and the second conductive pin 138 are connected to one side of the circuit board 130 by soldering or other conventional manner. Pins 144 and 146 are similarly electrically connected to the other side of the circuit board 130. Tips 150, 154 electrically connect the pins 144, 146 to the sensors (not shown).

Preferably, circuit board 130 is positioned within the initiator assembly 100 between the interior section 168 and the shoulder 176 of the insert member 164 prior to injection molding of the insulating material 160. Alternatively, the circuit board 130 may be positioned between the interior section 168 of the insert member 164 and the initiator 120. In any event, the circuit board 130 is incorporated into the structure of the initiator assembly 100 without enlarging or otherwise changing the dimensions or configuration of the initiator 120, including the cap member 124.

Similar to the first embodiment, the insert member 164 and the circuit board 130 are attached as part of the initiator assembly 100 during an injection molding process in which the insulating material 160 is in a flowable state. After hardening, the insert member 164 is fixedly held to remaining parts of the initiator assembly 100, particularly by means of the interconnection between the insulating material 160 and the interior section 168 of the insert member 164.

In the embodiment shown in FIG. 3, the size and shape of the first and second conductive pins 136, 138 allows the interior section 80 of insert member 40 to be symmetrical in cross section, i.e., to extend towards the interior of initiator assembly 28 approximately to the same extent from all sides. This may simplify manufacture and assembly of the insert member 164 and also allows for interior space between insert member 164 and the first and second conductive pins 136, 138 for the insulating material 160.

With reference to FIG. 4, a third embodiment of an initiator assembly is illustrated and comprises an initiator assembly 200, an initiator 208, circuit board 216, conductive pins 228, 230, 232 and 234, insulating material 212 and an insert member 220. The insert member 220 has an interior section 250, an intermediate section 254 and a shoulder 258, and is an integral, one-piece member fixedly held adjacent to the initiator 208 by means of the insulating material 212.

In this embodiment, the initiator 208 includes a cap member 224 and charge 226, with the first and second conductive pins 228, 230 positioned off center of initiator 208. This allows the first and second conductive pins 228, 230 to be straight, not bent or curved like the first and second conductive pins 136, 138 shown in FIG. 3. Also, with the size and configuration of the first and second conductive pins 228, 230, the insert member 220 may have an asymmetrical cross-section, like insert member 40 of the first embodiment shown in FIG. 2. That is, the interior section 250 of insert member 220 extends towards the interior of initiator assembly 200, preferably to a lesser extent in the proximity of second conductive pin 230. This allows for interior space between insert member 220 and the first and second conductive pins 228, 230 for the insulating material 212. The other portions of interior section 250 of the insert member 220 preferably extend towards the interior of the initiator assembly 200 to a greater extent to provide structural support.

A first conductive pin 228 and a second conductive pin 230 each have an upper portion that is held by a glass to metal seal within a bore 236 formed in the eyelet and a lower portion that is electrically connected to the circuit board 216. Pin 228 or 230 is electrically connected to receive and carry a signal from the circuit board 216 to ignite a charge 226 Insulating material 212 electrically insulates the two pins 228, 230 from each other, as well as surrounding portions of the cap member 224.

Like the first and second embodiments, the lower portion of the first and second conductive pins 228, 230 are connected to one side of the circuit board 216 by soldering or other conventional manner. Similarly, pin 232 having tip 240 and pin 234 having tip 242 electrically connect the circuit board 216 to the sensors (not shown).

Preferably, circuit board 216 is positioned within the initiator assembly 200 between the interior section 250 and the shoulder 258 of the insert member 220 prior to injection molding of the insulating material 212. Alternatively, the circuit board 216 may be positioned between the interior section 250 of the insert member 220 and the initiator 208. In any event, the circuit board 216 is incorporated into the structure of the initiator assembly 200 without enlarging or otherwise changing the dimensions or configuration of the initiator 208, including the cap member 224.

Similar to the first embodiment, the insert member 164 and the circuit board 130 are readily attached as part of the initiator assembly 100 during an injection molding process in which the insulating material 160 is in a flowable state. After hardening, the insert member 164 is fixedly held to remaining parts of the initiator assembly 100, particularly by means of the interconnection between the insulating material 160 and the interior section 168 of the insert member 164.

The insert member 220 also has a first interior section 260 that extends from the center interior section 250 in a direction towards and past an end of the cap member 224. The first interior section 260 is surrounded by the insulating material 212. A second interior section 264 is offset from the first interior section 260 and is located relatively more inwardly in the insulating material 212. The second interior section extends in an opposite direction from the first interior section 260, i.e., towards the tip 232 of the single conductive pin 228. The inner area of the second interior section 264 terminates at the bore 236. A total height can be defined between the top ends of the first and second interior sections 260, 264. This total height is greater than the height of the shoulder 240 and this total height is greater than the outward dimension or length of the shoulder 240.

Figure 5:
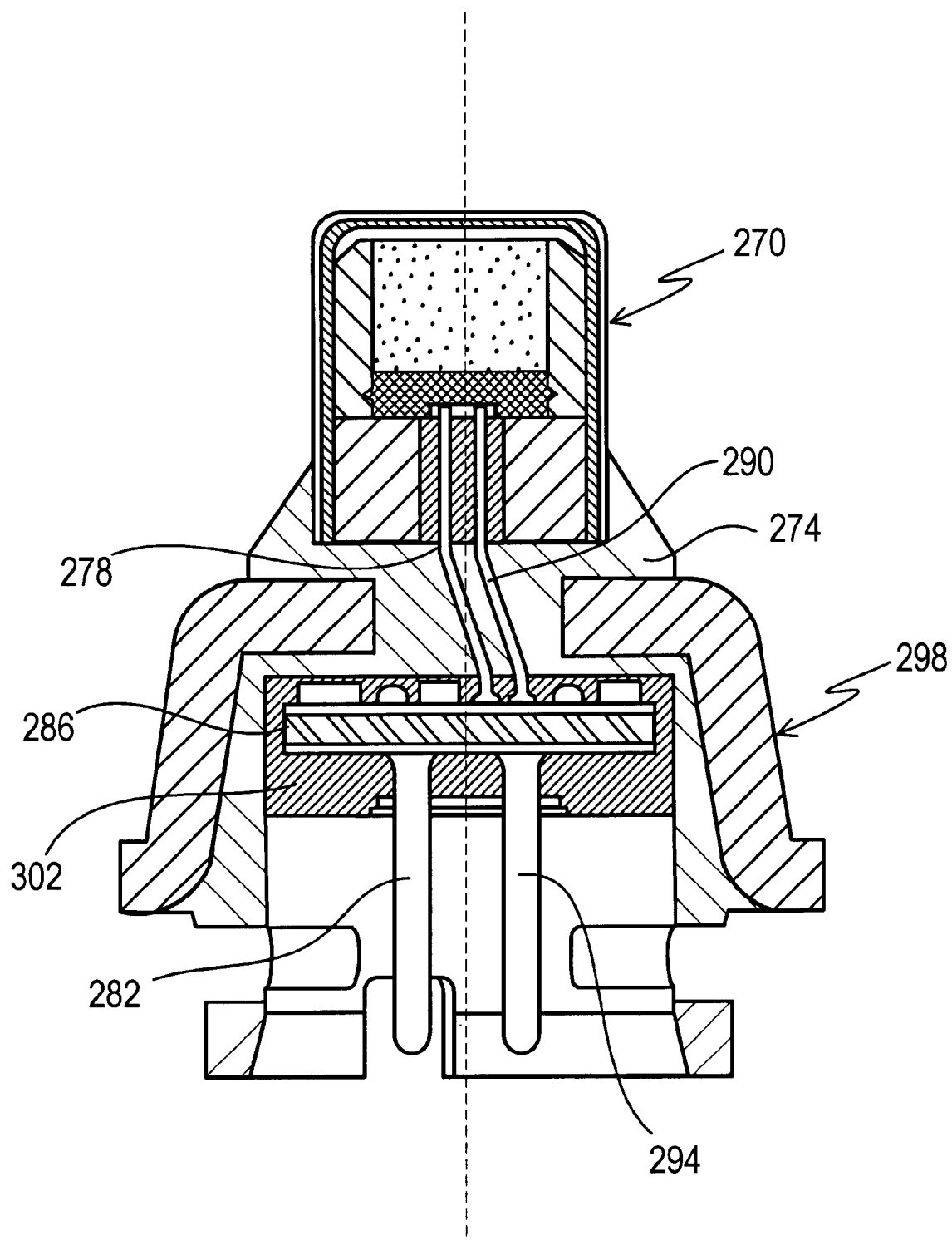
FIG. 5 is a cross-sectional view of an initiator assembly in which the PCB is held in place by an adhesive-type material.

Another embodiment is illustrated in FIG. 5, which is similar to FIG. 3, except that the circuit board is not held in place by injection molded material. Instead, an insulating potting or adhesive-like substance or material is utilized, such as an epoxy, RTV, and/or an appropriate adhesive(s). As depicted in FIG. 5, an initiator 270 has at least bottom portions thereof in engagement with such insulating material 274. Two conductive pins are joined to the initiator 270 in connection with its activation. A first conductive pin includes a first or upper portion 278 and a second or lower portion 282. The upper and lower portions 278, 282 are electrically connected through a circuit board 286. Similarly, the second conductive pin has a first or upper portion 290 and a second or lower portion 294 that are electrically interconnected. The insulating material 274 also causes interconnection of the insert member 298 to remaining parts of the initiator assembly. FIG. 5 also illustrates a potting material 302 that is used to interconnect or join the circuit board 286 to the insulating material 274 and thereby to other parts of the initiator assembly. As previously noted, the potting material 302 can include one or more of substances different from the injection molded material.

Figure 6:
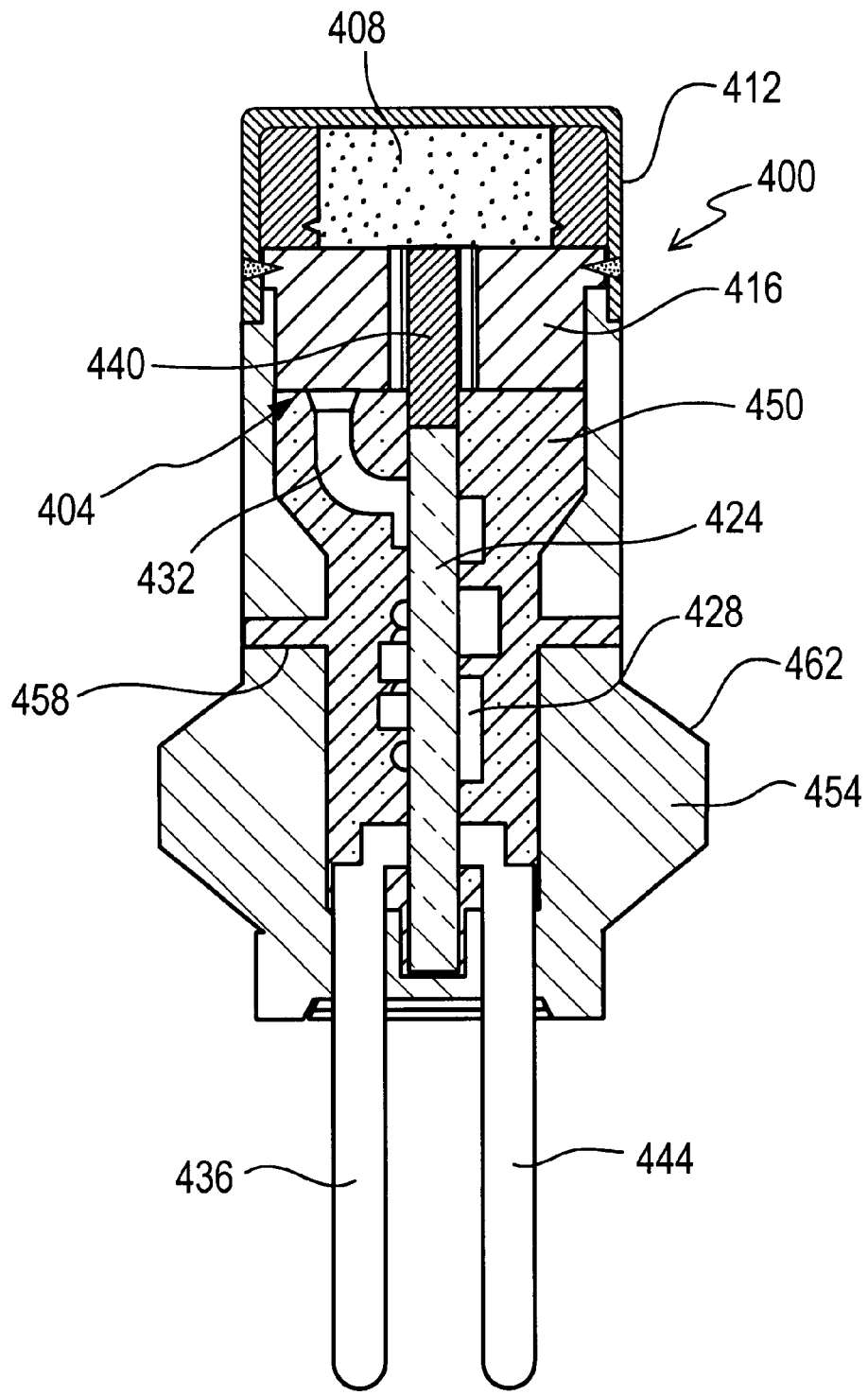
FIG. 6 is a cross-sectional view of an initiator assembly in which the PCB is positioned parallel to the longitudinal extent of the initiator assembly.

With reference to FIG. 6, an initiator assembly 400 includes an initiator 404 used in igniting a charge 408. The charge 408 is covered by a cap member 412, which surrounds at least portions of the initiator 404. The initiator 404 includes an electrically conductive eyelet 416, which is preferably made of stainless steel. The eyelet 416 has a bore formed therein with glass insulating material 420 located therein. A circuit board 424 extends in a longitudinal direction. The circuit board has a number of electronic components 428 connected to each of the opposing outer surfaces of the circuit board 424.

A first conductive pin 432 is connected to a first outer surface of the circuit board 424 and is also connected to the eyelet 416. A second conductive pin 436 is connected to the first outer surface of the circuit board 424 or adjacent to an opposite end of the circuit board 424 from the connection to the first conductive pin 432. In one embodiment, the first and second pins 432, 436 are electrically connected together and are part of an electrical ground path. With regard to a signal carrying path for use in activating the initiator assembly 400, an extension member 440 is joined to, or is part of, the circuit board 424 at the upper portions thereof. The extension member 440 has at least conductive portions for carrying the ignition signed to the heating element for triggering the initiator charge. In the illustrated embodiment, the extension member 440 has at least portions that are positioned in the bore of the eyelet 416 and are surrounded by the glass insulating material 420. At the opposite end of the circuit board 424 a signal carrying conductive pin 444 is provided in electrical communication with the signal carrying conductive portions of the extension member 440.

The circuit board 424 has substantial portions thereof surrounded by a potting material 450. A plastic or other acceptable material is preferably injection molded outwardly of substantial portions of the potting material 450. A passageway 458 is maintained between sections of the injection molded material 454 to permit desired placement of the potting material 450. The plastic material 454 includes a shoulder 462 for desired interconnection or mounting associated with the inflator.

It also be understood that each of the disclosed embodiments, as well as other embodiments within the scope of the present invention, can include any of the known or conventional heating elements, such as bridge wires, semiconductor bridges (SCBs) and thin-film resistors. For example, FIG. 2 depicts a bridge wire heating element, while FIGS. 3 and 4 depict a SCB (or thin-film resistor) heating element.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or uses of the invention. It is intended that the appended claims be construed to include alternative embodiments to the extent permitted by the prior art.

What is claimed is:

1. In a propellant-actuated device, an initiator assembly, comprising
    an initiator having an initiator charge and a cap member having a lateral extent, said initiator including at least a first conductive pin having a length for use in triggering; and
    activation circuitry connected to said initiator for receiving a control signal and including processing circuitry that processes said control signal to determine whether the propellant-actuated device is to be activated, said activation circuitry including a circuit board that is disposed relative to said initiator to have a lateral extent greater than said lateral extent of said cap member, said circuit board for supporting said processing circuitry and said circuit board being located substantially perpendicular to said length of said at least first conductive pin.

2. An initiator assembly, as claimed in claim 1, wherein:
    all portions of said circuit board are joined to said initiator closer to said at least first conductive pin than to said initiator charge.

3. An initiator assembly, as claimed in claim 1, further including:
    an insert member, with said insert member being located intermediate said circuit board and said initiator charge.

4. An initiator assembly, as claimed in claim 1, wherein:
said circuit board is joined to said initiator using molding material.

5. In a propellent-actuated device, an initiator assembly, comprising:
an initiator having an initiator charge and a cap member having a lateral extent, said initiator including at least a first conductive pin;
activation circuitry connected to said initiator for receiving a control signal and including processing circuitry that processes said control signal to determine whether the propellant-actuated device is to be activated, said activation circuitry including a circuit board, having a lateral extent greater than said lateral extent of said cap member, for supporting said processing circuitry, said circuit board being joined to said initiator adjacent said at least first conductive pin using molding material; and
an insert member being joined adjacent said first conductive pin using said molding material at substantially the same time said circuit board is joined to said at least first conductive pin.

6. An initiator assembly, as claimed in claim 1, wherein;
said processing circuitry is in communication with said at least first conductive pin.

7. An initiator assembly, as claimed in claim 1, wherein:
said circuit board has at least a first hole and said first hole receives said at least first conductive pin.

8. In a propellant-actuated device, an initiator assembly, comprising:
an initiator having an initiator charge and a cap member having a lateral extent, said initiator including at least one conductive pin having a length; and
activation circuitry connected to said initiator for receiving a control signal and including processing circuitry that processes said control signal to determine whether the propellant-actuated device is to be activated, said activation circuitry including a circuit board, having a lateral extent greater than said lateral extent of said cap member, for supporting said processing circuitry, said circuit board lateral extent being substantially in a plane that is perpendicular to the length of said at least one conductive pin and in which said lateral extent is greater than about 6 mm.

9. An initiator assembly, as claimed in claim 4, wherein:
at least portions of said activation circuitry are provided with a guard to protect said circuit board before said circuit board is joined to said initiator using said molding material.

10. An initiator assembly for use in control and activation of a propellant-actuated device, comprising:
an initiator including an eyelet having a co-axial bore and first and second outer surfaces, with insulating material located in said co-axial bore;
an initiator charge adjacent to said first outer surface; and
activation circuitry operatively associated with said initiator, said activation circuitry including a circuit board having end portions and an extension member extending from said end portions, at least portions of said extension member extending into said co-axial bore and being surrounded by said insulating material, said extension member including at least conductive portions for carrying a signal for use in igniting said initiator charge.

11. An initiator assembly, as claimed in claim 10, wherein:
said circuit board includes a first conductor for carrying a signal related to controlling ignition of said initiator charge.

12. An initiator assembly, as claimed in claim 11, wherein:
said initiator includes a second conductor electrically connected to and terminating at said second outer surface of said eyelet.

13. An initiator assembly, as claimed in claim 10, wherein:
said activation circuitry is operatively associated with said initiator using molding material and at least portions of said activation circuit are provided with a guard before said activation circuitry is joined to said initiator using said molding material in order to protect said activation circuitry portions from high temperature and high pressure when said molding material joins said activation circuitry to said initiator.

14. An initiator assembly, as claimed in claim 1, wherein:
said initiator has an initiator body and said circuit board is spaced from said initiator body, said circuit board having first and second surfaces with said first circuit board surface being closer to said initiator body than is said second circuit board surface, said initiator further including a second conductive pin and each of said first and second conductive pins extending in said space between said initiator body and said first circuit board surface, said activation circuitry including third and fourth conductive pins that are electrically connected to said first and second conductive pins, respectively, said third and fourth conductive pins extending away from said second circuit board surface.

15. An initiator assembly, as claimed in claim 14, wherein:
said first conductive pin is integral with said third conductive pin.

16. An initiator assembly, as claimed in claim 14, wherein:
said third conductive pin has an end that begins at said second circuit board surface and said end is spaced from said first conductive pin.

* * * * *